C. E. FARR.
TURN TABLE LOCK.
APPLICATION FILED JUNE 20, 1916.

1,210,288.

Patented Dec. 26, 1916.
2 SHEETS—SHEET 1.

Inventor
C. E. Farr,
By Victor J. Evans
Attorney

C. E. FARR.
TURN TABLE LOCK.
APPLICATION FILED JUNE 20, 1916.

1,210,288.

Patented Dec. 26, 1916.
2 SHEETS—SHEET 2.

Inventor
C. E. Farr,
By Victor J. Evans
Attorney

Witnesses

UNITED STATES PATENT OFFICE.

CORNELIA ELLIS FARR, OF MADISON STATION, MISSISSIPPI.

TURN-TABLE LOCK.

1,210,288.

Specification of Letters Patent.

Patented Dec. 26, 1916.

Application filed June 20, 1916. Serial No. 104,756.

*To all whom it may concern:*

Be it known that I, CORNELIA ELLIS FARR, a citizen of the United States, residing at Madison Station, in the county of Madison and State of Mississippi, have invented new and useful Improvements in Turn-Table Locks, of which the following is a specification.

This invention relates to turn tables of that type which are locked against rotation, thus preventing any accidental movement thereof and causing the derailment of the locomotive when shifting from the turn table on to the track rails, thereby avoiding injury to the workmen.

To this end, use is made of a lock automatically actuated into locked engagement with the base of the turn table, causing the track section of the turn table to be locked into alinement with the various branch track sections leading from the structure in which the turn table is installed, and positively holding the latter against any accidental rotation.

A still further object of the invention is the provision of a turn table having the locking means so connected therewith as to permit of the latch bolt being automatically operated to locking or unlocking position.

Another object of the invention resides in the provision of a turn table of the above stated character which shall be simple in construction, durable in use and well adapted for the purposes intended.

With the above and other objects in view, the invention consists in the novel features, details of construction and combination of parts which will hereinafter be more fully set forth, illustrated in the accompanying drawing and pointed out in the appended claims.

Figure 1:
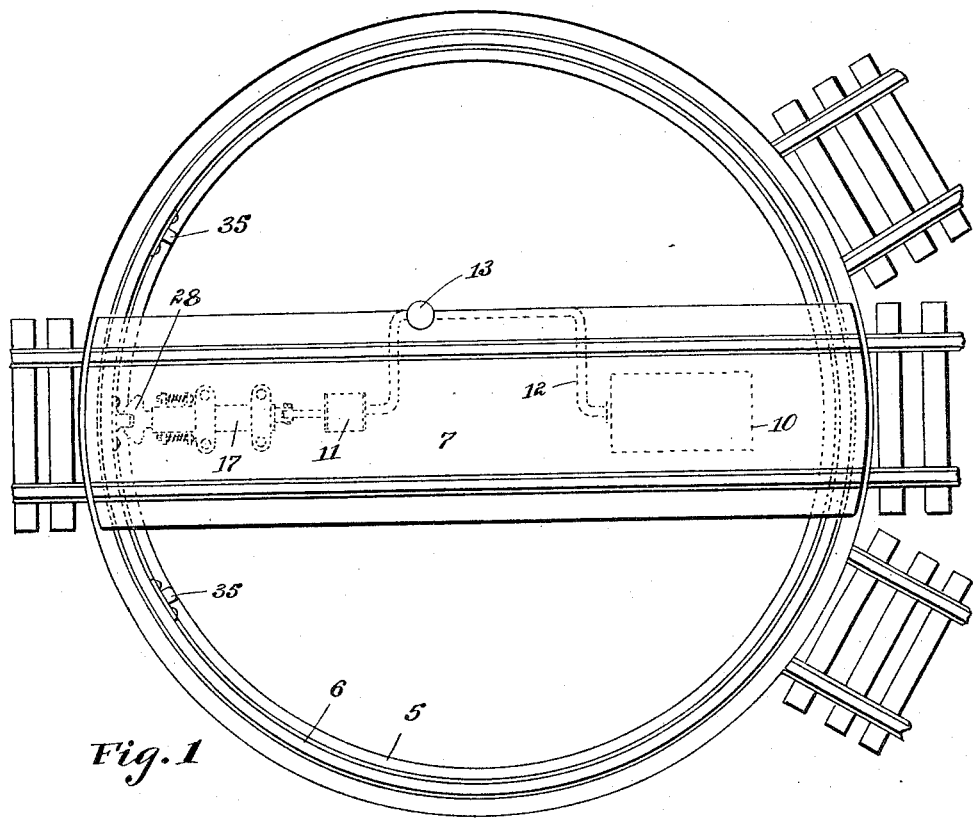
Figure 2:
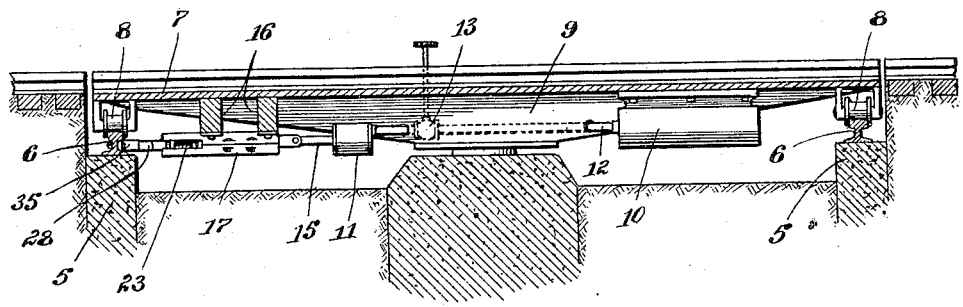
Figure 3:
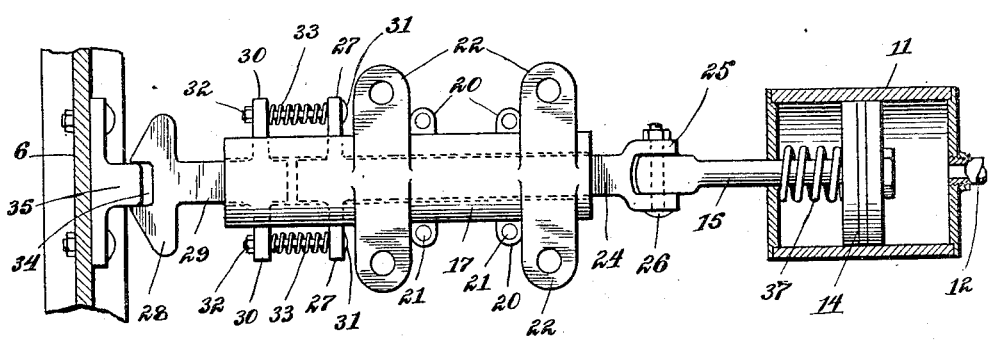
Figure 4:
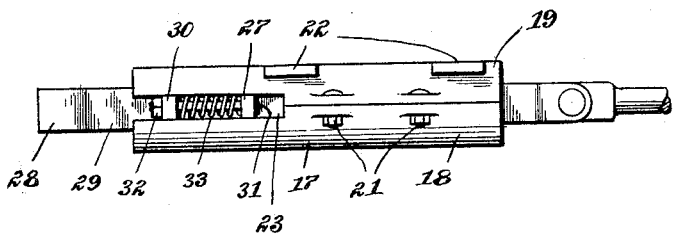

Figure 1 is a top plan view of the turn table; Fig. 2 is a vertical section; Fig. 3 is a view illustrating the lock and its parts removed from the turn table; and Fig. 4 is a detail view clearly illustrating the manner of connecting the latch with the latch bolt.

In the accompanying drawing, 5 denotes the foundation upon which is mounted the base constituting a circular track 6.

7 denotes the platform having secured on its under surface wheels 8 for revolubly mounting the platform upon the circular track 6. The platform 7, on its under surface, is further provided with a reinforcing beam 9.

It is my purpose to employ in connection with a turn table of the above stated character, an improved means for locking such against accidental rotation, thereby preventing the derailment of the engine and injury to the workmen, which frequently happens when the track sections of the turn table are not properly alined or positioned with respect to the branch track section. To this end, I provide an air storage tank 10 having communication with the air cylinder 11 through the medium of the piping 12. This storage tank and air cylinder are preferably positioned upon the reinforcing beam 9 of the platform and located within the length of the pipe 12 is a hand operated three-way valve 13. Mounted in the air cylinder 11 for reciprocating movement is a piston 14 having a rod 15. Supported from the under surface of the platform at a point in advance of the air cylinder 11, through the medium of hangers 16 is a hollow sectional casing 17 of substantially rectangular form in cross section. The sections 18 and 19 forming this casing are each provided with laterally extending apertured lugs 20 through which a fastener 21 passes, for securing the sections together, and the section 18 is provided with a base flange 22 to which the hangers 16 are secured, thus permanently supporting the casing in suspended relation with the reinforcing rib 9. Each of the sections 18 and 19 forming the casing 17 when in assembled position, presents a pair of guide slots 23 formed in the side walls of the casing 17 and opening out through the forward end thereof, the purpose of which will be hereinafter more fully set forth as the description of the invention is proceeded with.

Slidably mounted in the casing 17 is a latch bolt 24 having a bifurcated end 25 for receiving the forward end of the piston rod 15 and pivotally connected thereto by the bolt 26 passing through the bifurcated end of the latch bolt and to the free end of the piston rod 15, thus operatively connecting the latch bolt with the piston rod 15, while formed at the forward end of this latch bolt 24 are opposite laterally extending apertured lugs 27, which when the latch bolt is operatively associated with the casing, are adapted to slide within the guide slots 23 of such casing, for guiding the latch bolt and preventing any accidental rotation thereof within the casing 17 during the operation of such bolt. This casing 17 further accommodates the mounting therein of a resilient latch 28 of substantially T-shape and having its shank 29 inserted within the forward end of such casing and positioning the angular opposite laterally extending lug 30 of the shank within the guide slot 23 of the casing, thus also preventing any accidental rotation of this yieldable latch and further assisting in guiding the movements thereof upon the operation of the latch bolt. Extending through the apertures of the respective lugs 27 and 30 are loosely mounted bolts 31 securely fastened to the T-shaped latch 28 through the medium of nuts 32. Embracing these bolts 31 are helical springs 33 exerting an outward pressure on the latch bolt at all times, and serving to hold the socket 34 of the head in locking engagement with a catch 35. The catches 35 are positioned on the web portion of the circular track 6 and extend inwardly thereof at spaced intervals apart throughout the diameter of the track, permitting the platform 7 being adjustably locked for alining the track section 36 of the platform in alinement with one of the branch tracks upon which a locomotive is to be shifted. The latter track sections are not shown.

In briefly describing the operation of this invention, it is to be stated when it is desired to lock the platform against rotation, the operator turns the three-way valve 13 admitting a quantity of air from the storage tank 10 into the air cylinder 11, of sufficient pressure to move the piston 14 in a forward direction of the air cylinder, thus forcing the head of the latch bolt into locking contact with one of the catches 35. Now when it is desired to release the latch bolt from the catch 35, the operator will again rotate the valve 13, allowing the compressed air within the air cylinder 11 to escape and the latch bolt will be withdrawn from engagement with the catch 35 through the medium of the strong retraction spring 37. This spring 37 encircles the piston rod 15 and is confined between one of the end walls of the air cylinder and the confronting face of the piston head 14.

From the foregoing description, taken in connection with the accompanying drawing, the advantages of construction and of the method of operation will be readily apparent to those skilled in the art to which the invention relates, and while I have described the principles of operation of the invention, together with the device which I now consider to be the best embodiment thereof, I desire to have it understood that the device shown is merely illustrative, and that such changes may be made when desired as are within the scope of the claims appended hereto.

I claim:

1. A turn table lock including a casing formed with guide slots, a latch bolt slidably mounted within the casing and having laterally extending lugs, fitting in the slots of the casing, a latch head, and means for yieldably connecting the latch head to the lugs of the latch bolt, and means for automatically operating the latch bolt.

2. A turn table lock including a casing formed with guide slots, a latch bolt slidably mounted within the casing and having laterally extending lugs, fitting in the slots of the casing, a latch head, and means for yieldably connecting the latch head to the lugs of the latch bolt, and means for operating the latch bolt in opposite directions.

3. A turn table lock including a casing formed with guide slots, a latch bolt slidably mounted within the casing and having laterally extending lugs, fitting in the slots of the casing, a spring pressed latch head connected with the lugs of the latch bolt and slidably mounted within said casing, and means for operating the latch bolt.

4. In a turn table, a base, having a series of laterally extending catches, a platform rotatably supported upon the base, locking mechanism carried by the platform and disposed below and in a horizontal plane with respect to the platform, and means carried by the platform for throwing the locking mechanism into and out of contact with the laterally extending projections of the base, substantially as and for the purpose specified.

5. A device of the class described, a base, a platform rotatably mounted upon the base, means for locking the platform to the base, a latch bolt, a latch head, means connecting the latch head to one end of the bolt, resilient means encircling the latter mentioned means and defined between the confronting ends of the latch bolt and latch head.

6. A turn table, in combination with a base having a series of latches connected thereto, of a platform rotatably mounted upon the base, a casing secured to the platform and provided at one end with guide slots, and a lock slidably mounted within the guide slots of said casing, and means for throwing the lock into and out of engagement with the catches of the base, substantially as and for the purpose specified.

In testimony whereof I affix my signature.

Mrs. CORNELIA ELLIS FARR.

Copies of this patent may be obtained for five cents each, by addressing the "Commissioner of Patents, Washington, D. C."